US008636373B2

(12) United States Patent
Kunimochi

(10) Patent No.: US 8,636,373 B2
(45) Date of Patent: Jan. 28, 2014

(54) SPREAD ILLUMINATING APPARATUS

(75) Inventor: Toru Kunimochi, Kitasaku-gun (JP)

(73) Assignee: Minebea Co., Ltd., Nagano (JP)

( * ) Notice: Subject to any disclaimer, the term of this patent is extended or adjusted under 35 U.S.C. 154(b) by 4 days.

(21) Appl. No.: 13/558,922

(22) Filed: Jul. 26, 2012

(65) Prior Publication Data

US 2013/0033898 A1 Feb. 7, 2013

(30) Foreign Application Priority Data

Aug. 5, 2011 (JP) ................. 2011-171936

(51) Int. Cl.
*G02F 1/13357* (2006.01)
*F21V 8/00* (2006.01)
(52) U.S. Cl.
USPC ............ 362/97.2; 362/615; 362/631; 349/63; 349/64
(58) Field of Classification Search
USPC ................ 349/62–65; 362/97.2, 631
See application file for complete search history.

(56) References Cited

U.S. PATENT DOCUMENTS

| 2009/0322983 | A1* | 12/2009 | Hashino | 349/61 |
| 2010/0328580 | A1* | 12/2010 | Kim | 349/64 |
| 2011/0025949 | A1* | 2/2011 | Park | 349/64 |
| 2011/0141397 | A1* | 6/2011 | Lee | 349/64 |

FOREIGN PATENT DOCUMENTS

JP   A-2007-287550   11/2007

* cited by examiner

*Primary Examiner* — Karabi Guharay
(74) *Attorney, Agent, or Firm* — Oliff & Berridge, PLC

(57) ABSTRACT

A spread illuminating apparatus includes a light source, a flexible printed circuit board, and a light guiding plate. The light guiding plate has a light incident face, and a light output portion planarly outputting light. The light guiding plate has an inclined portion between the light incident face and the light output portion, the inclined portion having an inclined face gradually reducing in thickness from the light incident face toward the light output portion; the flexible printed circuit board is placed on the light guiding plate from the side of the inclined face, and has a mounting portion mounting the light source, and a bent portion bent to the mounting portion and fixed to the inclined face of the inclined portion, and the bent portion includes a thickness reduced portion having a thickness less than the mounting portion.

7 Claims, 7 Drawing Sheets

SPREAD ILLUMINATING APPARATUS

BACKGROUND OF THE INVENTION

1. Field of the Invention

The present invention relates to a spread illuminating apparatus, and more particularly to a sidelight-type spread illuminating apparatus including a light guiding plate with a light source provided on a light incident face of the light guiding plate. In the spread illuminating apparatus, planar illumination light is adapted to exit out from a light output portion of the light guiding plate.

2. Description of Related Art

In a lighting device provided with a liquid crystal display panel, a sidelight-type spread illuminating apparatus (backlight) having compact, environmentally-compatible LEDs, the LEDs being arranged along the light incident face of a light guiding plate, has been widely applied. This type of spread illuminating apparatus has particularly been used in the field of compact portable information devices such as mobile phones.

Since information devices have become much thinner in recent, further thin spread illuminating apparatuses have also strongly demanded. To accomplish the above demand, for example, the following spread illuminating apparatus has been proposed. That is, an inclined surface is provided near the light incident face of a light guiding plate as that the thickness of the light guiding plate gradually reduces from the light incident face thereof toward a light output face thereof. With this structure, the thickness of the light incident face of the light guiding plate is configured to correspond to the light output face of each LED. On the other hand, the light output face portion of the light guiding plate is allowed to have further thin configuration. See, for example, Japanese Patent Application Laid-Open No. 2007-287550.

An example of conventional spread illuminating apparatus is shown in FIG. 8. A spread illuminating apparatus 100 has a light guiding plate 101 and a LED 112. The light guiding plate 101 is formed in a manner so as to gradually reduce its thickness from the side of a light incident face 104 toward a light output face 102 by providing an inclined face 106 in the vicinity of the light incident face 104. The LED 112 is implemented on a flexible printed circuit board 110, and placed on the light incident face 104 of the light guiding plate 101.

In addition, the spread illuminating apparatus 100 has a diffusing sheet 121 and a prism sheet 122 layered to each other on the side of the light output face 102 of the light guiding plate 101, and further has a light-shielding sheet 124 around on the light incident face 104 as well as around on an end face 105 placed opposite to the light incident face 104. A reflection sheet 123 is provided on the back surface 103 of the light guiding plate 100.

Here, in the spread illuminating apparatus 100, a flexible printed circuit board 110 is bent at a bending line 111 to have a downwardly curved shape. The flexible printed circuit board 110 is thus arranged on the inclined face 106 of the light guiding plate 101. A mounting portion 110a located in the rear side of the bending line 111 is arranged substantially perpendicular to the light incident face 104 such that a light emitting face 112a of the LED 112 placed on the mounting portion 110a faces the light incident face 104 in a substantially parallel relationship. On the other hand, a bent portion 110b located in the front side of the bending line 111 is fixed to the inclined face 106 by a fixing means such as a double-sided adhesive tape.

Such a configuration where the flexible printed circuit board 110 is bent to place the bent portion 110b along the inclined face 106 of the light guiding plate 101 is an advantageous configuration for inhibiting light leakage from the inclined face 106. Moreover, optical sheets such as the diffusing sheet 121 and the prism sheet 122 are placed as that their ends at the side of the light incident face 104 are layered on the bent portion 110b of the flexible printed circuit board 110. Accordingly, even if light is leaked from the inclined portion 106 through the bent portion 110b of the flexible printed circuit board 110, the occurrence of a so-called hot spot, which locally produces a high-luminance region, can be inhibited with the optical sheets and the like.

However, in the spread illuminating apparatus 100 having such a configuration as shown in FIG. 8, when, for example, the fixing means for fixing the flexible printed circuit board 110 to the light-guiding plate 101 deteriorates due to environmental factors and the like, there has been a problem that the bent portion 110b can be peeled off from the inclined portion 106 through a reaction force of bending of the flexible printed circuit board 110. When such a peeling off occurs, the optical properties of the spread illuminating apparatus 100 may deteriorate because, for example, a so-called hot spot is produced by the increase of leaked light from the inclined face 106, and/or because brightness and the uniformity of brightness are reduced by the occurrence of the displacement of the LED 112 with respect to the light guiding plate 101.

Furthermore, in the configuration where the ends of optical sheets such as the diffusing sheet 121 and prism sheet 122 at the side of the light incident face 104 are layered on the bent portion 110b of the flexible printed circuit board 111, since these ends are placed in a state where they are raised by the thickness of the flexible printed circuit board 111 (and, the thickness of the fixing means for the inclined face 106), there has been a problem that it is likely to cause a misassembling such that the optical sheets override the upper surface (the surface at the side of the light output face 102 of the light guiding plate 101) of a housing frame 125 covering the perimeter of the light guiding plate 101 as shown in FIG. 9. FIG. 9 depicts an example where the diffusing sheet 121 and two prism sheets 122a and 122b were layered on the light output face 102 of the light guiding plate 101, and the displacement of the upper prism sheet 122b has occurred. In FIG. 9, the flexible printed circuit board 110 mounting the LED 112 is not shown.

This problem will have become more important when the housing frame 125 needs to be as thin as possible for responding to the demand of further thin spread illuminating apparatuses.

SUMMARY OF THE INVENTION

The present invention has been made in light of the above problems, and it is an object of the present invention to provide a spread illuminating apparatus, which achieves slimming down by providing an inclined face in the vicinity of a light incident face, and also capable to stably obtain excellent brightness properties and to improve the ease of assembly.

Embodiments according to the present invention hereinbelow exemplify some structures of the present invention, and are itemized for facilitating understanding of various structures of the present invention. Each item does not intend to limit the technical scope of the present invention. While considering the best modes to carry out the present invention, even if components of each item is partially substituted or deleted, or even if another component is added thereto, these should be regarded as the elements of the technical scope of the present invention.

A spread illuminating apparatus including: a point-like light source; a flexible printed circuit board on which the point-like light source is mounted; and a light guiding plate including: a light incident face, at which the point-like light source is placed; and a light output portion with a light output face for planarly outputting light that has entered from the light incident face, wherein the light guiding plate has an inclined portion between the light incident face and the light output portion, the inclined portion having an inclined face gradually reducing in thickness in a direction from the light incident face toward the light output portion, the flexible printed circuit board is placed on the light guiding plate from the side of the inclined face, and has a mounting portion mounting the point-like light source, and a bent portion bent with respect to the mounting portion and fixed to the inclined face of the inclined portion, and the bent portion includes a thickness reduced portion at least at the side of the front end thereof, the thickness reduced portion having a thickness less than the mounting portion.

According to the spread illuminating apparatus of the first aspect of the present invention, the spread illuminating apparatus having the inclined portion formed in the vicinity of the light incident face of the light guiding plate is configured so as to place the flexible printed circuit board on the light guiding plate from the side of the inclined face, and to fix the bent portion to the inclined face, which achieves the elimination or inhibition of the occurrence of leaked light from the inclined face, and a high brightness circular region (hot spot), which is produced in the vicinity of the light incident face by the leaked light.

At this time, in the spread illuminating apparatus of the aspect, the bent portion of the flexible printed circuit board includes a reduced thickness portion at least at the front end side, which has a thickness less than the mounting portion, and therefore, when the spread illuminating apparatus includes a member provided at the side of the light output face of the light guiding plate, it eliminates or reduces the likelihood of the displacement of the member due to the overlap between the end of the member at the side of the light incident face of the light guiding plate and the bent portion of the flexible printed circuit board, and improves the ease of assembly of the spread illuminating apparatus.

The structure of the spread illuminating apparatus of the first aspect of the present invention is particularly advantageous when the end of the member, provided at the side of the light output face of the light guiding plate, at the side of the light incident face of the light guiding plate is placed intentionally overlapping the front end of the bent portion of the flexible printed circuit board for reasons such as optical properties.

Furthermore, in the spread illuminating apparatus according to the aspect, the structure where the bent portion of the flexible printed circuit board includes the thickness reduced portion having a thickness less than the mounting portion, at the side of at least the front end, is also advantageous in the following point. Note that the mounting portion of the flexible printed circuit board, and a portion having the same thickness as the mounting portion other than the mounting portion, if any, are collectively called a normal thickness portion.

In the spread illuminating apparatus according to the aspect, when the flexible printed circuit board is bent at the thickness reduced portion (including a boundary between the thickness reduced portion and the normal thickness portion), the reaction force of bending reduces as compared with the case that the flexible printed circuit board is bent at the normal thickness portion. Therefore, the spread illuminating apparatus according to the aspect is capable to utilize the reduction of the reaction force of bending of the flexible printed circuit board at the thickness reduced portion to make the bent portion hard to peel off from the inclined face and to improve the stability and weatherability of the fixation of the bent portion to the inclined face when the flexible printed circuit board is placed on the light guiding plate.

The spread illuminating apparatus according to the first aspect, further including an optical sheet placed at the side of the light outputting face of the light guiding plate, wherein the optical sheet is placed such that one end of the optical sheet at the side of the light incident face of the light guiding plate overlaps at least a part of the thickness reduced portion of the flexible printed circuit board.

In the spread illuminating apparatus according to the aspect, since the optical sheet is provided such that the end of the light guiding plate at the side of the light incident face overlaps at least a part of the thickness reduced portion of the flexible printed circuit board, the occurrence of a hot spot can be inhibited with the layered optical sheet even if light is leaked from the inclined face of the light guiding plate or the boundary between the inclined face and the light output face through the bent portion of the flexible printed circuit board. Furthermore, when the optical sheet is provided in this manner, the amount of lift of the end face at the light incident face of the light guiding plate reduces, and thus the displacement such as an override on the top face (a face at the side of the light output face) of the housing frame covering the perimeter of the light guiding plate is inhibited, and the ease of assembly of the spread illuminating apparatus is improved.

The spread illuminating apparatus according to the first or second aspect, wherein the bent portion of the flexible printed circuit board is entirely comprised of the thickness reduced portion.

In the spread illuminating apparatus according to the aspect, since the bending line constituting a boundary between the mounting portion and the bent portion of the flexible printed circuit board accords with the boundary between the thickness reduced portion and the normal thickness portion, it is capable to utilize the reduction of the reaction force of bending of the flexible printed circuit board at the thickness reduced portion to make the bent portion hard to peel off from the inclined face and to improve the stability and weatherability of the fixation of the bent portion to the inclined face. The spread illuminating apparatus according to the aspect is capable to stably obtain excellent luminance properties for an extended period without producing any hot spot or producing any reduction of brightness or reduction of the uniformity of brightness due to the displacement of the point-like light source with respect to the light incident face.

The spread illuminating apparatus according to the third aspect, wherein the flexible printed circuit board is placed on the light guiding plate such that a boundary line between the mounting portion and the bent portion accords with an inclination start line of the inclined face of the light guiding plate located at the side of the light incident face.

The spread illuminating apparatus according to the aspect is capable to maximize the area of a part of the bent portion of the flexible printed circuit board used for fixation to the inclined face of the light guiding plate, and thus capable to improve the adhesive strength of the bent portion to the inclined face.

The spread illuminating apparatus according to the third aspect, wherein the flexible printed circuit board is placed on the light guiding plate such that a boundary line between the mounting portion and the bent portion is positioned ahead of an inclination start line of the inclined face of the light guiding plate located at the side of the light incident face.

The spread illuminating apparatus according to the aspect is capable to ensure a relatively wide area of the flexible printed circuit board ahead of the point-like light source to be efficiently used as a wiring space.

The spread illuminating apparatus according to any one of the first to fifth aspect, wherein the flexible printed circuit board includes a base film, a wiring layer formed on the base film, and a cover film layered on the wiring layer, and the thickness reduced portion is comprised of the base film.

The spread illuminating apparatus according to the aspect is capable to easily configure the thickness reduced portion, utilizing the multilayered structure of the flexible printed circuit board.

The spread illuminating apparatus according to any one of the first to fifth aspect, wherein the flexible printed circuit board includes a base film, a wiring layer formed on the base film, and a cover film layered on the wiring layer, and the thickness reduced portion is comprised of the cover film.

The spread illuminating apparatus according to the aspect is capable to easily configure the thickness reduced portion utilizing the multilayered structure of the flexible printed circuit board as well as to increase the fixation area between the thickness reduced portion and the inclined face of the light guiding plate to improve the adhesive strength as compared with the case that the thickness reduced portion is formed by a base film. Furthermore, in the spread illuminating apparatus according to the aspect, when the bent portion of the flexible printed circuit board is entirely formed by the thickness reduced portion, the amount of bending of the thickness reduced portion is made smaller as compared with a spread illuminating apparatus having a similar structure except that the thickness reduced portion is formed by the base film, and the reaction force of bending can be thus made smaller.

According to the present invention, the above configurations are capable to provide a spread illuminating apparatus having a inclined face in the vicinity of the light incident face to achieve slimming down, and are capable to stably obtain excellent brightness properties and to improve the ease of assembly.

BRIEF DESCRIPTION OF THE DRAWINGS

FIG. 6A is a top view of a flexible printed circuit board and FIG. 6B is a sectional side view of the spread illuminating apparatus in the assembled state;

DETAILED DESCRIPTION OF THE PREFERRED EMBODIMENTS

Figure 1:
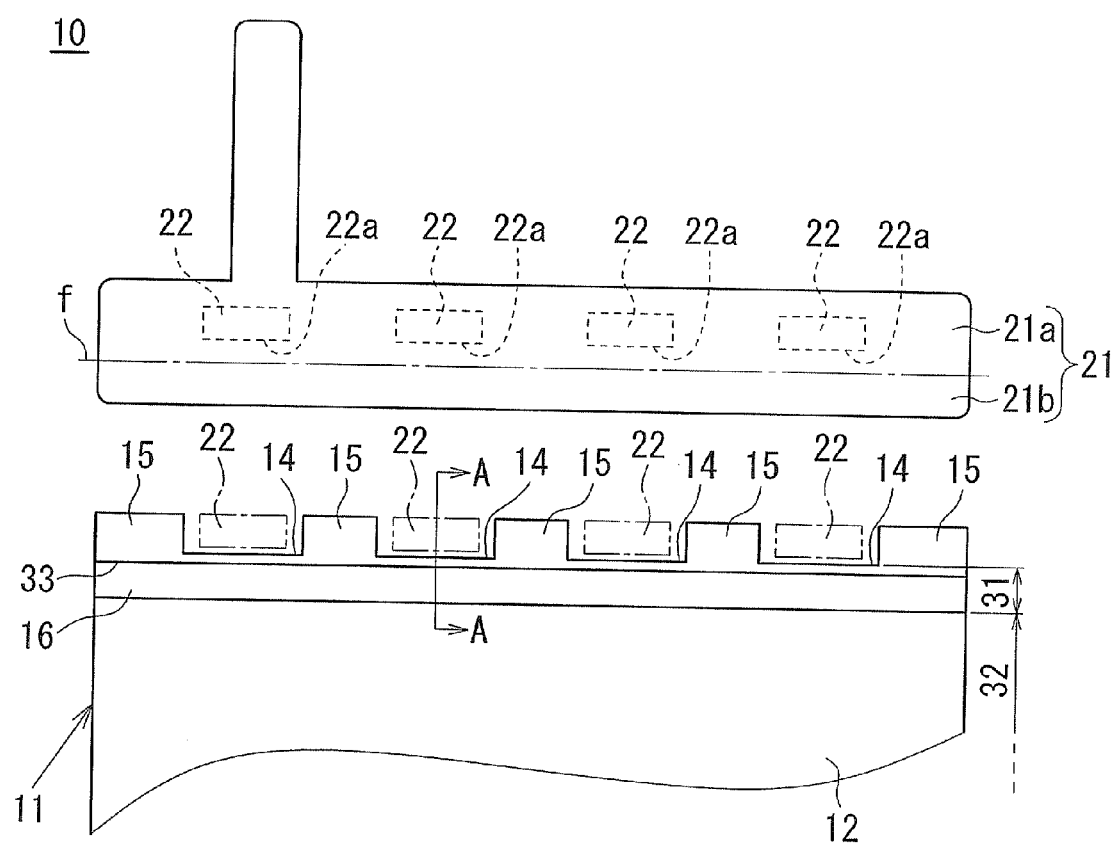
FIG. 1 is an exploded top view illustrating the main components of the spread illuminating apparatus of one embodiment of the present invention.
Figure 2:
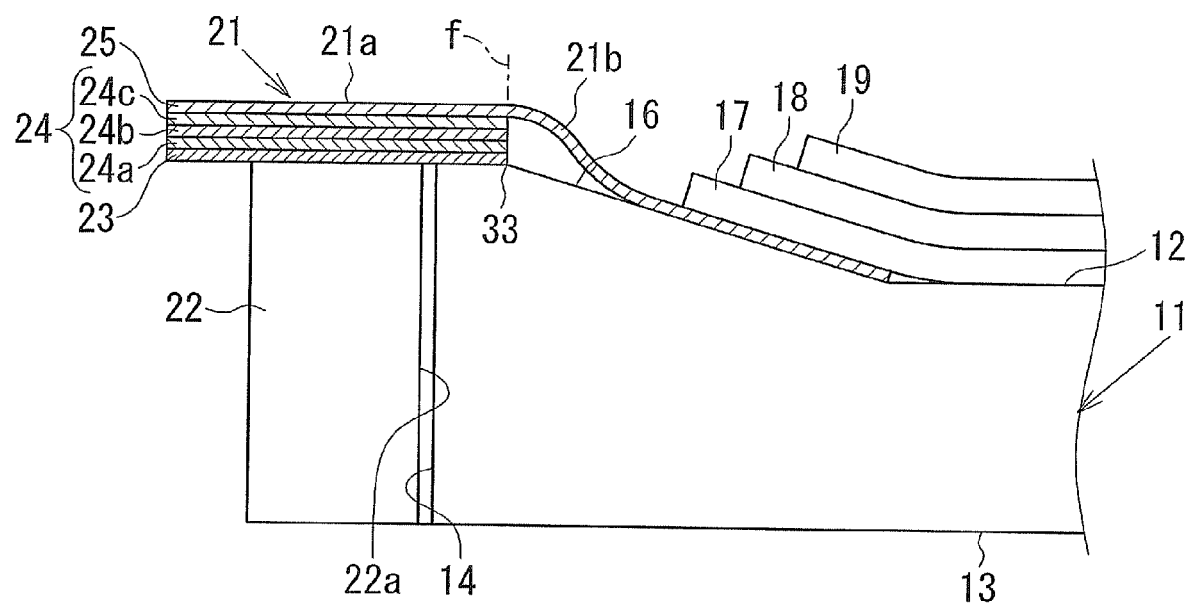
FIG. 2 is a sectional view of line A-A in the assembled state of the spread illuminating apparatus of FIG. 1.

Embodiments of the present invention will be explained with reference to the accompanying drawings. FIG. 1 is an exploded top view illustrating the main components of a spread illuminating apparatus 10 of one embodiment of the present invention, and FIG. 2 is a sectional view of line A-A in the assembled state of the spread illuminating apparatus 10.

The spread illuminating apparatus 10 includes: a plurality of LEDs 22 (four LEDs in the illustrated example) as point-like light sources; a flexible printed circuit board (hereinafter referred to as FPC) 21 mounting the LEDs 22; and a light guiding plate 11 for planarly outputting light emitted from the LEDs 22. Here, each LED 22 is formed in a rectangular parallelepiped shape as a whole, and is a so-called side-view-type LED having a light emitting face 22a at one side, and the face mounted on the FPC 21 (mounting face) and the light emitting face 22a are substantially perpendicular to each other.

The light guiding plate 11 is formed in a substantially rectangular shape in the top view from a transparent material (for example, polycarbonate resin), and one end face is provided with a light incident face 14. The LEDs 22 are arranged along the light incident face 14 such that their light emitting face 22a is directed to the light incident face 14 of the light guiding plate 11.

The spread illuminating apparatus 10 further includes a housing frame (not shown) covering the perimeter of the light guiding plate 11. At the side of the light output face 12 of the light guiding plate 11, a diffusing sheet 17, and prism sheets 18 and 19 are provided as shown in FIG. 2 (not shown in FIG. 1). Here, in the spread illuminating apparatus 10, a direction, in which the light emitting face 22a of the LEDs 22 faces (with respect to the light guiding plate 11, a direction from the light incident face 14 toward the side end face (not shown)), is defined as "the front side".

The light guiding plate 11 has a light output portion 32 for planarly outputting light of the LEDs 22 that has entered through the light incident face 14, from the light output face 12. The light output portion 32 is formed in a rectangular plate shape having a certain thickness less than the light incident face 14, and the main face of one side is the light output face 12. The main face 13 of the other side opposite to the light output face 12 (the back surface) may be provided with a light-path conversion pattern formed by a plurality of dots, for example.

In the spread illuminating apparatus 10, an inclined portion 31 is provided between the light incident face 14 and the light output portion 32. The inclined portion 31 inclines toward the back surface 13 in the front side direction from the side of the light incident face 14 at a certain degree, and has an inclined face 16, which continues to the light output face 12. Therefore, the inclined portion 31 is formed in a manner so as to gradually reduce its thickness from the side of the light incident face 14 toward the side of the light output portion 32.

Furthermore, on the light incident face 14 of the light guiding plate 11, nails 15 protruding toward the rear side from the light incident face 14 are formed integral to the light guiding plate 11. The nails 15 are used for positioning and fixing the FPC 21, and each nail 15 is formed in a rectangular parallelepiped shape extending from a region of the light incident face 14 beside a LED 22 toward the rear side in a state where the FPC 21 is installed.

In the example shown in FIGS. 1 and 2, the inclined portion 31 of the light guiding plate 11 has, at the side of the light incident face 14, a plane portion, which continues to the inclination start line 33 (which is a side at the side of the light incident face 14 of the inclined face 16) and is formed into the same face as the top face of the nails 15 (the face at the side of the light output face 12). However, in the spread illuminating apparatus 10, the light guiding plate 11 may not have such a plane portion, but the inclination start line 33 may directly continue to the top face of the nails 15.

In the spread illuminating apparatus 10, the FPC 21 has, as shown in FIG. 2, a layered structure including five layers in total; base film 23, wiring layer 24 formed on the base film 23, and cover film 25 layered on the wiring layer 24, and the wiring layer 24 has three layers; first adhesive layer 24a, conductor pattern (copper film) layer 24b, and second adhesive layer 24c. The total thickness of such FPC 21 is typically 80 µm or more.

The FPC 21 is bent in a down-curved shape in a side view to be placed on the light guiding plate 11 from the side of the inclined face 16, and have two portions divided by the bending line (shown as imaginary line f in FIG. 1) as a boundary; one is mounting portion 21a mounting the LEDs 22 and locates at the rear side, and the other is bent portion 21b bent to the mounting portion 21a at the bending line f and locates at the front side.

In the spread illuminating apparatus 10, the mounting portion 21a of the FPC 21, and a portion other than the mounting portion 21a having the same thickness as the mounting portion 21a, if any, are collectively called a normal thickness portion.

As shown in FIG. 2, the bent portion 21b is only formed by the base film 25 as a whole, and thus is formed as a thickness reduced portion (for example, a thickness of 12.5 µm), which is thinner than the normal thickness portion (for example, a thickness of 83 µm). In the case of this example, the bending line f, which defines the boundary between the mounting portion 21a and the bent portion 21b, is also the boundary between the normal thickness portion and the thickness reduced portion. The FPC 21 is placed on the light guiding plate 11 such that bending line f accords with the inclination start line 33 of the inclined face 16. At this time, the mounting portion 21a is positioned substantially perpendicular to the light incident face 14 such that the light emitting face 22a of the LEDs 22 faces the light incident face 14 in a substantially parallel relationship. In addition, the bent portion 21b is bent from the bending line f toward the inclined face 16 to place a portion of at least its front end along the inclined face 16, and the portion of the front end placed along the inclined face 16 is fixed on the inclined face 16 by any appropriate fixing means such as a double-sided sticky tape.

In the spread illuminating apparatus 10, since nails 15 projecting from the light incident face 14 toward the rear side are formed, portions of the mounting portion 21a of the FPC 21 facing the nails 15 are typically fixed on the top face of the nails 15 by any appropriate fixing means such as a double-sided sticky tape.

In addition, the spread illuminating apparatus 10 has the diffusing sheet 17 and the prism sheets 18 and 19 (hereinafter collectively referred to as optical sheets) placed at the side of the light output face of the light guiding plate 11 (not shown in FIG. 1), and one end of the optical sheets 17, 18 and 19 at the side of the light incident face 14 of the light guiding plate 11 are overlapped on a part of the bent portion 21b of the FPC 21 fixed on the inclined face 16.

In the spread illuminating apparatus 10, since the bent portion 21b of the FPC 21 is configured as a thickness reduced portion as described above, a reaction force of bending at the bending line f of the FPC 21 reduces, resulting in that the bent portion 21b is less likely to peel off the inclined face 16 and that the stability and weatherability of the fixation of the bent portion 21b to the inclined face 16 are improved, and any hot spot due to leaked light from the inclined face 16 is not be produced, or any reduction of brightness or reduction of the uniformity of brightness due to the displacement of the LED 22 with respect to the light incident face 14 does not occur, which allow excellent luminance properties to be stably obtained for a long time.

Furthermore, since the bent portion 21b of the FPC 21 is configured as a thickness reduced portion, the amount of the lift of the end face of the optical sheets 17, 18 and 19 at the side of the light incident face 14 of the light guiding plate 11 reduces, resulting in that the displacement such as an override on the top face (a face at the side of the light output face) of the housing frame covering the perimeter of the light guiding plate, and that the ease of assembly of the spread illuminating apparatus is improved.

Figure 3:
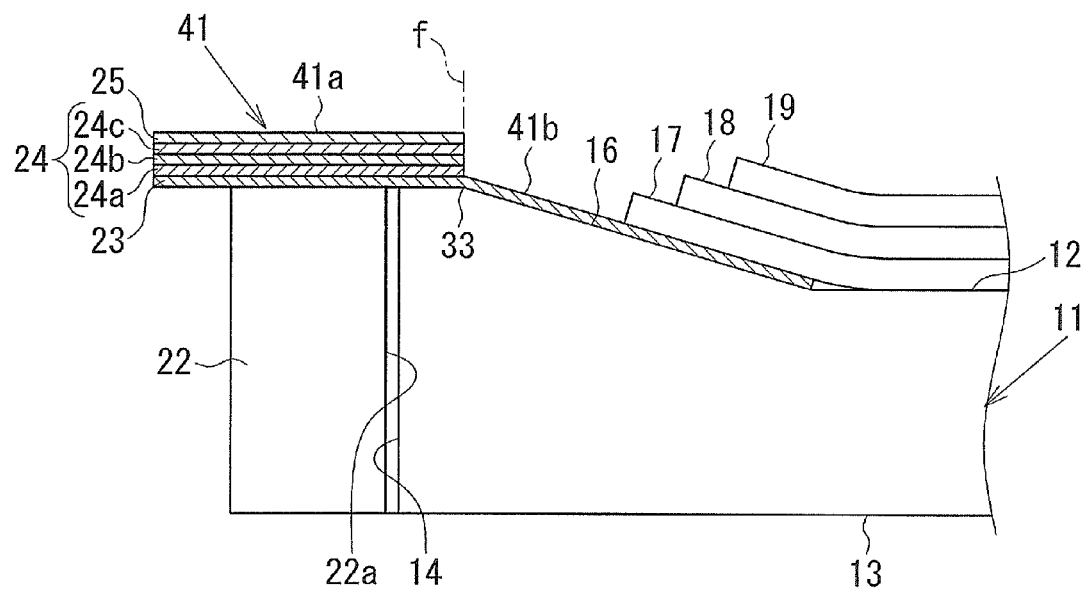
FIG. 3 is a sectional side view illustrating the first modified example of the spread illuminating apparatus of one embodiment of the present invention.

The spread illuminating apparatus 10 may have a FPC 41, in which the thickness reduced portion (in this case, the whole of a bent portion 41b) is formed by the cover film 23, as shown in FIG. 3. In the spread illuminating apparatus 10 having the FPC 41 placed at the side of the inclined face 16, since the cover film 23 of the FPC 41 faces the light guiding plate 11, the FPC 41 allows the whole surface of the thickness reduced portion (in this case, the bent portion 41b) to be used as a fixing face to the inclined face 16. Therefore, as compared with the FPC 21 shown in FIG. 2, a fixation area between the thickness reduced portion and the inclined face 16 of the light guiding plate 11 can be increased and its adhesive strength may be improved. Furthermore, as compared with the FPC 21, the FPC 41 is more advantageous in that, as the amount of bending of the thickness reduction portion is small, the reaction force of bending can be made smaller.

Figure 4:
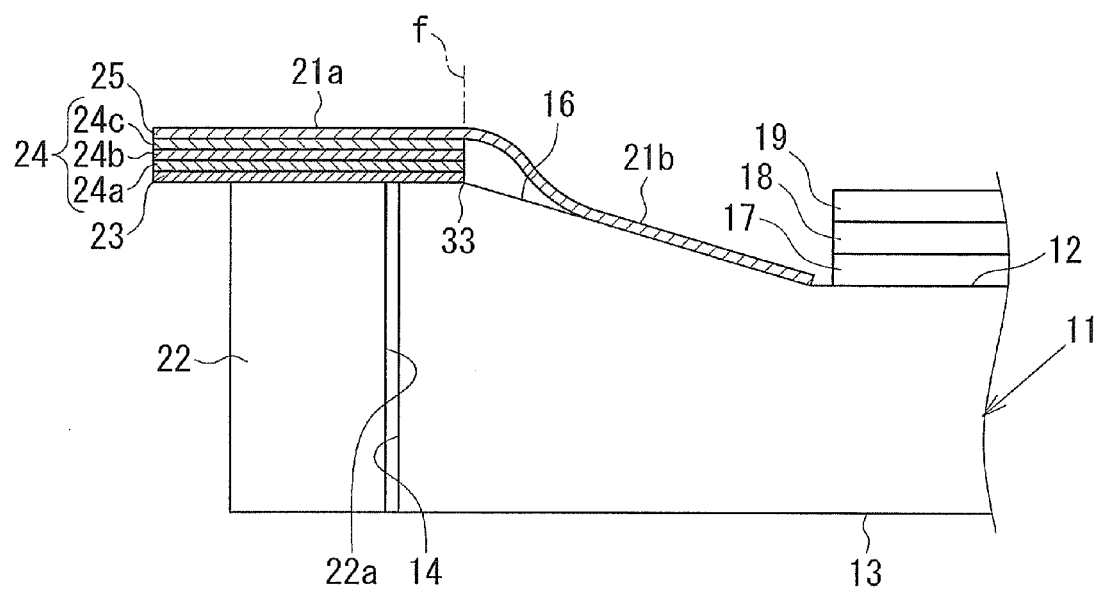
FIG. 4 is a sectional side view illustrating the second modified example of the spread illuminating apparatus of one embodiment of the present invention.

In the spread illuminating apparatus 10, as shown in FIG. 4, the end of the optical sheets 17, 18 and 19 at the side of the light incident face 14 of the light guiding plate may be placed without overlapping the bent portion 21b of the FPC 21. It is needless to say that the configuration exhibits the same functions and effects as the configuration shown in FIG. 2 regarding the reduction of the reaction force of bending of the FPC. Regarding the displacement of the optical sheets, it also exhibits a certain effect in that the displacement of the optical sheets 17, 18 and 19 toward the light incident face 14 is less likely to cause an override on the bent portion 21b of the FPC 21, which ultimately causes an override on the top face (the face at the side of the light output face) of the housing frame to lead to a critical disassembling. The FPC used in the configuration shown in FIG. 4 may be one that the thickness reduced portion is formed by the cover film 23 as in the FPC 41 shown in FIG. 3.

In the examples described above with reference to FIGS. 1-4, the FPCs 21 and 41 are arranged on the light guiding plate 11 such that the bending line f accords with the inclination start line 33 of the inclined face 16. The configuration can maximize the area of a part of the bent portion 21b used for fixation to the inclined face 16, and is thus advantageous in improving the stability of fixation of the bent portion 21b to the inclined face 16.

Figure 5:
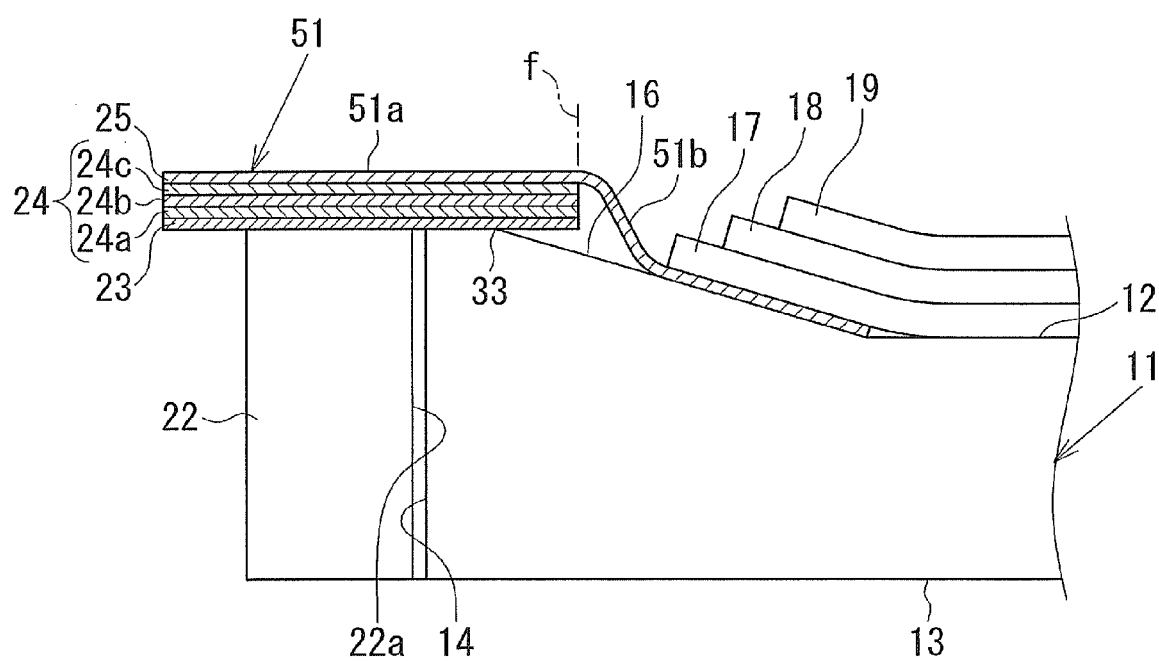
FIG. 5 is a sectional side view illustrating the third modified example of the spread illuminating apparatus of one embodiment of the present invention.

However, the spread illuminating apparatus 10 may have a FPC 51 shown in FIG. 5, which is placed on the light guiding plate 11 such that its bending line f is located at the rear side of the start line 33 of the inclined face 16. The configuration is advantageous in that a relatively wide area of the FPC 51 is ensured ahead of the LEDs 22 to be efficiently used as a wiring space.

Furthermore, in the spread illuminating apparatus 10, the FPCs 21 and 41 may be placed on the light guiding plate 11 such that its bending line f is located ahead of the start line 33 of the inclined face 16 (not shown in the drawings).

Although in the above examples with reference to FIG. 1-5, the bent portions 21b, 41b and 51b of the FPCs 21, 41 and 51 are entirely formed by the thickness reduction portion, in the spread illuminating apparatus 10, the bent portion may be one that at least a part of the front end is included in the thickness reduction portion. A preferable embodiment of this case will be described with reference to FIGS. 6A and 6B.

Figure 6A:
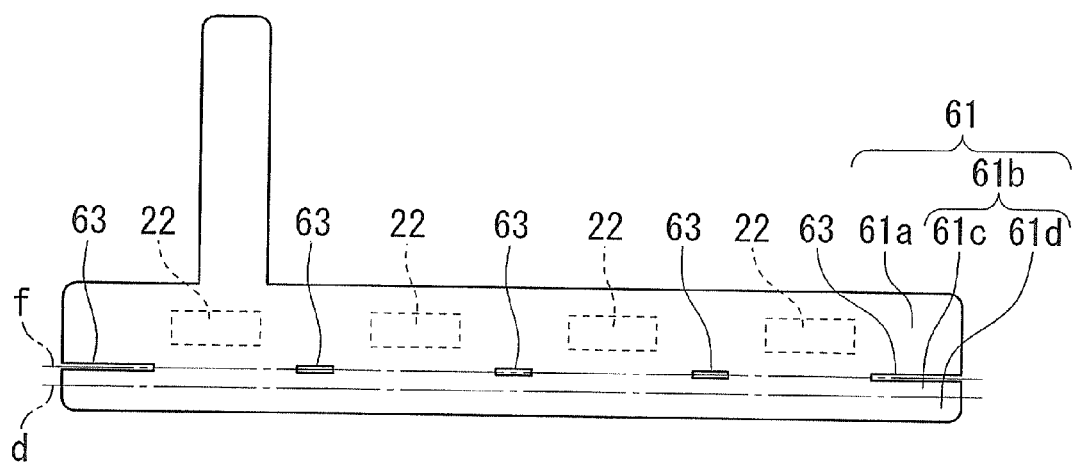
FIGS. 6A and 6B illustrate the fourth modified example of the spread illuminating apparatus of one embodiment of the present invention.
Figure 6B:
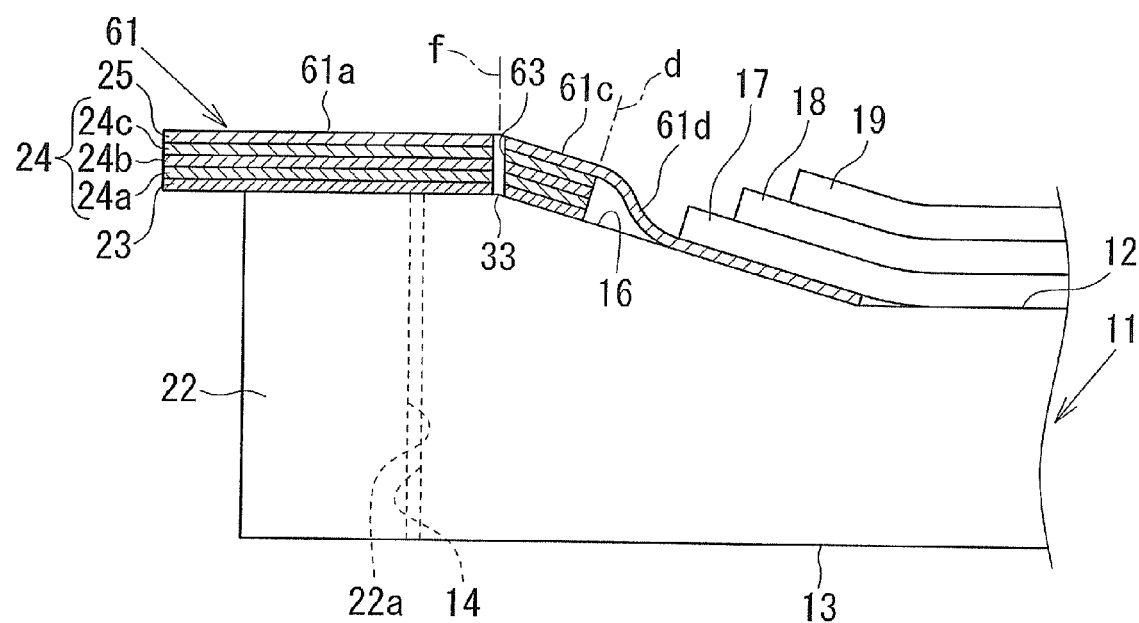

A FPC 61 shown in FIGS. 6A and 6B has a mounting portion 61a mounting LEDs 22, and a bent portion 61b bent with respect to a mounting portion 61a at a bending line f. The mounting portion 61a and the bent portion 61b are divided by the bending line f as a boundary, and the mounting portion 61a is located at the rear side of the FPC 61 and the bent portion 61b is located at the front side of the FPC 61. Furthermore, the bent portion 61b includes: a normal thickness portion 61c provided on the side of the mounting portion 61a and having the same thickness as the mounting portion 61a; and a thickness reduced portion 61d provided at the front end and formed by a base film 25. That is, the normal thickness portion of the FPC 61 includes: the mounting portion 61a; and the normal thickness portion 61c within the bent portion 61b. A boundary d between the normal thickness portion 61a, 61c and the thickness reduced portion 61d is located ahead of the bending line f.

In addition, the FPC 61 has slits 63 dispersed along the bending line f. These slits 63 are provided in regions of the FPC 61 other than regions in front of the LEDs 22 (namely, the front side regions of portions between the adjacent LEDs, and also the front side regions of portions between LEDs 22 at the ends and the end faces adjacent to each LED 22 of the FPC 61), and are formed as holes penetrating the FPC 61 in the thickness direction (the first slit).

The FPC 61 is arranged on the light guiding plate 11 from the side of the inclined face 16 such that the bending line f accords with the inclination start line 33 of the inclined face 16. At this time, the mounting portion 61a is arranged substantially perpendicular to the light incident face 14 such that the light emitting face 22a of the LEDs 22 faces the light incident face 14 in a substantially parallel relationship. The normal thickness portion 61c of the bent portion 61b is placed along the inclined face 16. At least a portion of the front end of the thickness reduced portion 61d is placed along the inclined face 16 by bending the thickness reduced portion 61d from the thickness boundary d toward the inclined face 16. The portion of the front end of the thickness reduced portion 61d placed along the inclined face 16, or both of the portion of the front end of the thickness reduced portion 61d placed along the inclined face 16 and the normal thickness portion 61c are fixed on the inclined face 16 by any appropriate fixing means such as a double-sided adhesive tape.

In the example shown in FIGS. 6A and 6B, although the structure including the thickness reduced portion 61d in the bent portion 61b is not utilized for reducing the reaction force of bending at the bending line f of the FPC 61, it exhibits the same function and effect as the structure shown in FIG. 2 in terms of the inhibition of occurrence of disassembling due to the displacement of the optical sheets 17, 18 and 19.

In the configuration shown in FIGS. 6A and 6B, the function of reduction of the reaction force of bending at the bending line f of the FPC 61 is carried out by the slits 63 provided along the bending line f. At this time, the structure where the slits 63 are formed as holes penetrating the FPC 21 in the thickness direction is advantageous in effectively reducing the reaction force of bending of the FPC 21. Furthermore, forming such slits 63 in the regions of the FPC 61 other than the regions in front of the LEDs 22 is advantageous in that light emitted from each LED 22, entering into the light guiding plate 11 and going through the light guiding plate 11 in a gradually broadening manner toward the front side hardly reaches the slits 63 and thus leaked light from the slit 63 is hardly produced.

However, in the structure shown in FIGS. 6A and 6B, when the reduction of the reaction force of bending at the bending line f is not particularly required, the slits 63 may not be provided in the FPC 61, and the bending is simply made in the normal thickness portions 61a and 61c. In addition, in the structure shown in FIG. 6B, the FPC 61 may be arranged such that the bending line f is located ahead of the inclination start line 33 of the inclined face 16 as shown in FIG. 5 regardless of the presence or absence of the slits 63. Furthermore, in the structure shown in FIGS. 5 and 6A and 6B, the thickness reduced portion of the FPC 51 (bent portion 51b) and the thickness reduced portion 61d of the FPC 61 may be formed by the cover film 23 as in the FPC 41 shown in FIG. 3, and/or the optical sheets 17, 18 and 19 may be arranged without overlapping their ends of the light guiding plate 11 at the side of the light incident face 14 on the bent portions 51b and 61b of the FPCs 51, 61.

In addition, in the spread illuminating apparatus 10, the light guiding plate provided with the above FPCs 21, 41, 51, 61 may have a inclined portion 81, which is gradually reduced in thickness from the side of the light incident face 74 toward the light output portion 82, and which includes first inclined faces 76 and second inclined faces 77 having less inclination than the first inclined faces 76. In this case, the second inclined faces 77 function as a seat for the FPCs 21, 41, 51, 61. Parts of the bent portions 21b, 41b, 51b, 61b of the FPCs 21, 41, 51, 61 used for fixation to at least inclined faces are placed along the second inclined faces 77, and fixed to the second inclined faces 77 by any appropriate fixation means such as a double-sided adhesive tape.

Hereinafter a description will be made of a preferable embodiment of the inclined portion 81 of the light guiding plate 71. In the light guiding plate 71, the second inclined faces 77 are formed spaced apart from each other so as not to present in front of the LEDs 22 (not shown in FIG. 7) (namely, in front of the light incident face 74 between adjacent nails 75). Each second inclined face 77 is formed in a shape that a space between two adjacent second inclined faces 77 with the first inclined face 76 in between widens toward the front side.

In addition, the first inclined faces 76 and the second inclined faces 77 share one side at the side of the light incident face 74 as an inclination start line 83, which is configured in a manner so as to continue to a plan portion formed into the same plane as the top faces of the nails 75. However, similarly to the light guiding plate 11, the light guiding plate 71 may not have such a plane portion, and the inclination start line 83 may directly continue to the top faces of the nails 75.

Figure 7:
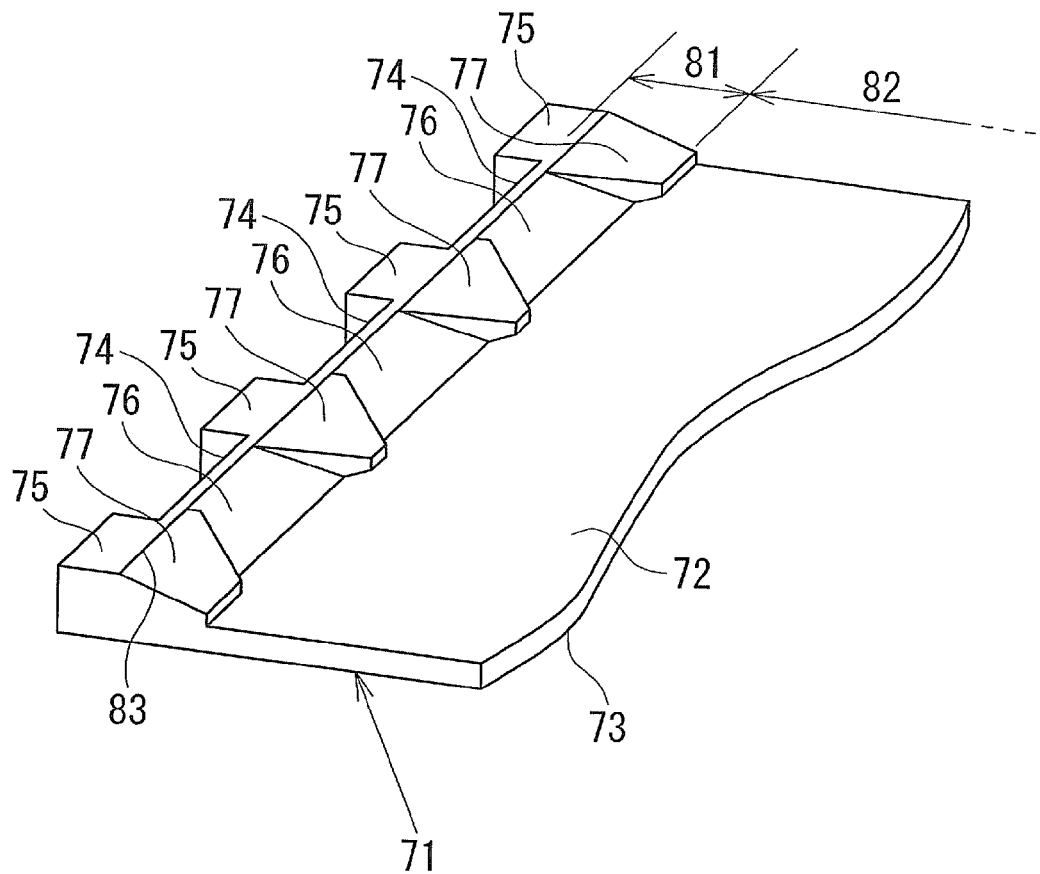
FIG. 7 is a perspective view illustrating the fifth modified example of the spread illuminating apparatus of one embodiment of the present invention.
Figure 8:
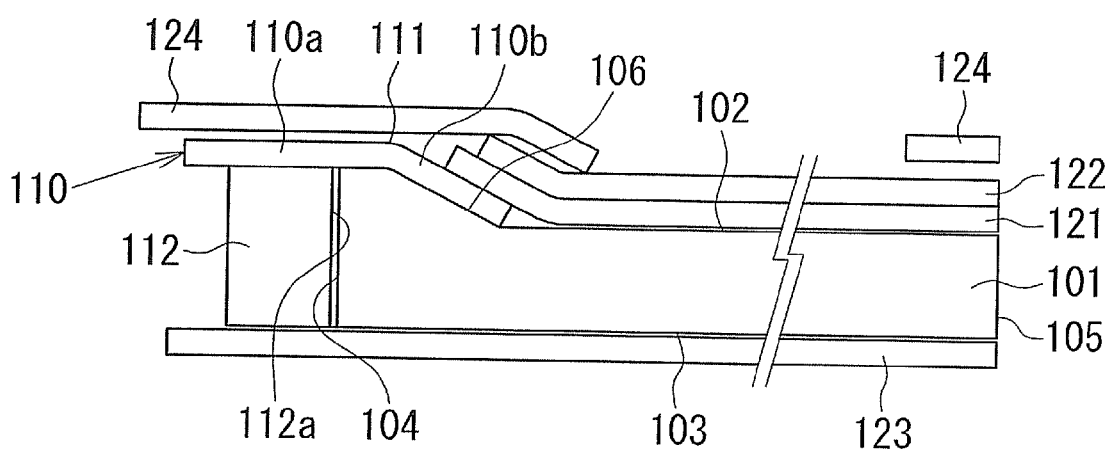
FIG. 8 is a sectional side view illustrating one example of a conventional spread illuminating apparatus.
Figure 9:
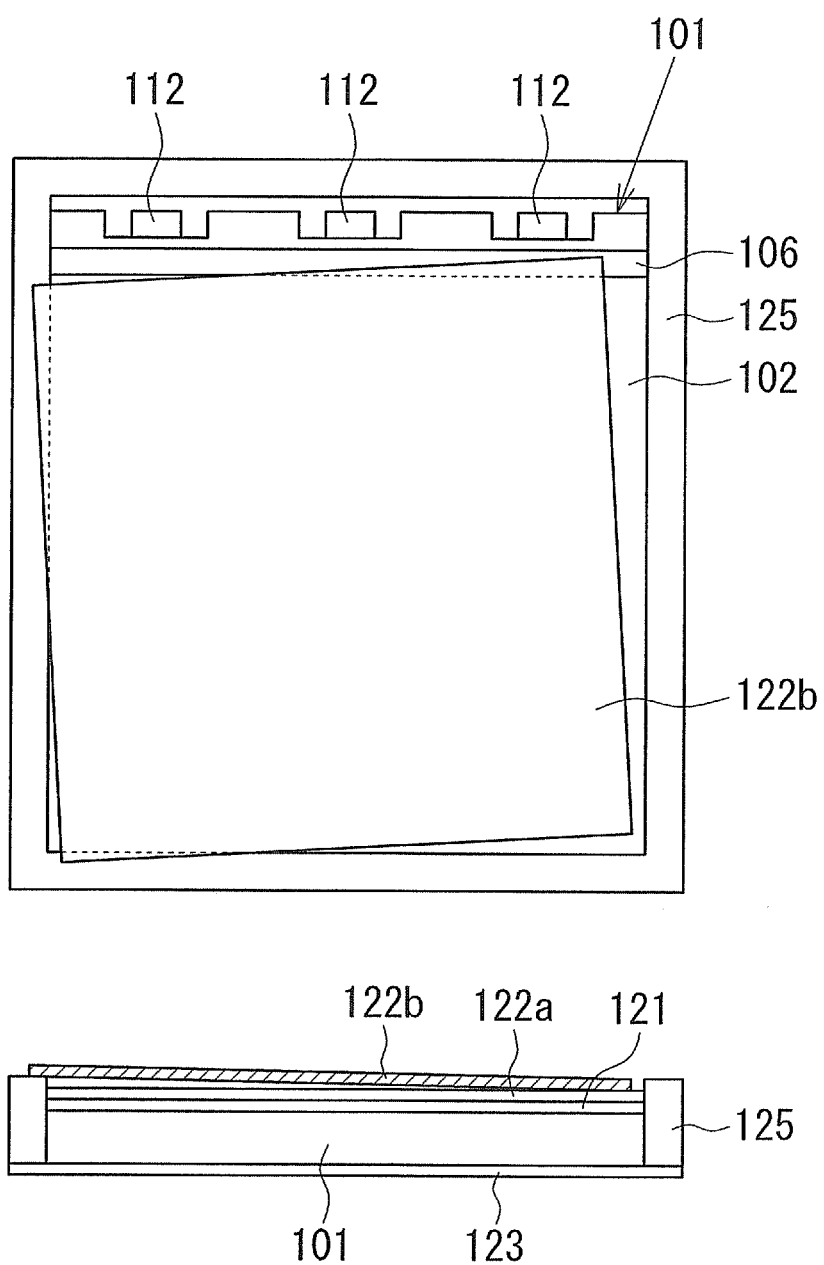
FIG. 9 illustrates a state of displacement of an optical sheet in a conventional spread illuminating apparatus.

In the spread illuminating apparatus 10, when the light guiding plate 71 shown in FIG. 7 is employed, a gap is formed between the FPC 21 and each first inclined face 76 presenting in front of each LED 22 in a state that the FPCs 21, 41, 51, 61 is fixed on the second inclined faces 77. Therefore, light guided through the light guiding plate 71 is inhibited from being directly absorbed by the FPCs 21, 41, 51, 61, resulting in that a higher brightness of the spread illuminating apparatus 10 can be achieved.

In addition, since light emitted from the LEDs 22 goes through the light guiding plate 71 in a gradually broadening manner toward the font side, forming the shape of each second inclined face 77 such that the space between two adjacent second inclined faces 77 with a first inclined face 76 broadens toward the front side ensures the light passage of light guided into the light guiding plate 71 and simultaneously widens the area of the top face of the second inclined faces 77 as much as possible, which improves the adhesive strength between the bent portions 21b, 41b 51b, 61b of the FPCs 21, 41, 51 61 and the second inclined faces 77.

Although the present invention has been described based on the preferable embodiments so far, the present invention should not be limited to the above embodiments. For example, in the FPCs 21, 41, 51, 61, a light absorption member (for example, black color paint) for absorbing leaked light from the inclined face 16 of the light guiding plate 11 and the first and second inclined faces 76 and 77 of the light guiding plate 71, or a light reflection member (for example, white color paint) for utilizing leaked light from the inclined faces 16, 76, 77 as usable light may be applied on a portion (for example, at least one of the base film 25 and the cover film 23) facing the inclined faces 16, 76, 77 of the light guiding plates 11, 71.

In addition, although the configuration of the spread illuminating apparatus 10 having nails 15, 75 on the light incident faces 14, 74 of the light guiding plates 11, 71 is an advantageous configuration in improving the adhesive strength between the light guiding plates 11, 71 and the FPCs 21, 41, 51, 61, the spread illuminating apparatus of the present invention may not necessarily have the nails 15, 75 on the light guiding plates 11, 71.

Although not shown or described, it is obvious that spread illuminating apparatus 10 may further include any appropriate element such as a light shielding sheet, which is placed above the vicinity of the light incident faces 14, 74 and the vicinity of the end face facing the light incident faces 14, 74.

What is claimed is:

1. A spread illuminating apparatus comprising:
   a point-like light source;
   a flexible printed circuit board on which the point-like light source is mounted; and
   a light guiding plate including:
   a light incident face, at which the point-like light source is placed; and
   a light output portion with a light output face for planarly outputting light that has entered from the light incident face,
   wherein the light guiding plate has an inclined portion between the light incident face and the light output portion, the inclined portion having an inclined face and being configured to gradually reduce in thickness in a direction from the light incident face toward the light output portion,
   the flexible printed circuit board is placed on the light guiding plate from the side of the inclined face, and has a mounting portion mounting the point-like light source, and a bent portion bent with respect to the mounting portion and fixed to the inclined face of the inclined portion, and
   the bent portion includes a thickness reduced portion at least at the side of the front end thereof, the thickness reduced portion having a thickness less than the mounting portion.

2. The spread illuminating apparatus according to claim 1, further comprising an optical sheet placed at the side of the light outputting face of the light guiding plate, wherein the optical sheet is placed such that one end of the optical sheet at the side of the light incident face of the light guiding plate overlaps at least a part of the thickness reduced portion of the flexible printed circuit board.

3. The spread illuminating apparatus according to claim 1, wherein the bent portion of the flexible printed circuit board is entirely comprised of the thickness reduced portion.

4. The spread illuminating apparatus according to claim 3, wherein the flexible printed circuit board is placed on the light guiding plate such that a boundary line between the mounting portion and the bent portion accords with an inclination start line of the inclined face of the light guiding plate located at the side of the light incident face.

5. The spread illuminating apparatus according to claim 3, wherein the flexible printed circuit board is placed on the light guiding plate such that a boundary line between the mounting portion and the bent portion is positioned ahead of an inclination start line of the inclined face of the light guiding plate located at the side of the light incident face.

6. The spread illuminating apparatus according to claim 1, wherein the flexible printed circuit board includes a base film, a wiring layer formed on the base film, and a cover film layered on the wiring layer, and the thickness reduced portion is comprised of the base film.

7. The spread illuminating apparatus according to claim 1, wherein the flexible printed circuit board includes a base film, a wiring layer formed on the base film, and a cover film layered on the wiring layer, and the thickness reduced portion is comprised of the cover film.

\* \* \* \* \*